United States Patent
Igarashi

(10) Patent No.: US 8,365,768 B2
(45) Date of Patent: Feb. 5, 2013

(54) FLUIDIC DEVICE UNIT STRUCTURE

(75) Inventor: Hiroki Igarashi, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 630 days.

(21) Appl. No.: 12/227,967

(22) PCT Filed: Apr. 19, 2007

(86) PCT No.: PCT/JP2007/058492
§ 371 (c)(1),
(2), (4) Date: Dec. 3, 2008

(87) PCT Pub. No.: WO2007/141962
PCT Pub. Date: Dec. 13, 2007

(65) Prior Publication Data
US 2009/0308474 A1    Dec. 17, 2009

(30) Foreign Application Priority Data
Jun. 7, 2006  (JP) ................ 2006-158407

(51) Int. Cl.
*F16K 11/22*  (2006.01)
(52) U.S. Cl. ........................... 137/597; 137/563
(58) Field of Classification Search ........... 137/563, 137/597, 884
See application file for complete search history.

(56) References Cited

U.S. PATENT DOCUMENTS

| | | | |
|---|---|---|---|
| 4,627,457 A * | 12/1986 | Bird et al. .................. | 137/1 |
| 5,819,782 A | 10/1998 | Itafuji | |
| 5,988,217 A | 11/1999 | Ohmi et al. | |
| 6,035,893 A | 3/2000 | Ohmi et al. | |
| 6,116,283 A | 9/2000 | Yamaji et al. | |
| 6,142,539 A | 11/2000 | Redemann et al. | |
| 6,152,175 A | 11/2000 | Itoh et al. | |
| 6,186,177 B1 | 2/2001 | Maher | |
| 6,192,932 B1 * | 2/2001 | Izumo et al. ............... | 137/606 |
| 6,209,571 B1 | 4/2001 | Itoh et al. | |
| 6,273,139 B1 | 8/2001 | Ohmi et al. | |
| 6,615,871 B2 * | 9/2003 | Ohmi et al. ............... | 137/884 |

(Continued)

FOREIGN PATENT DOCUMENTS

| | | |
|---|---|---|
| JP | 11-294698 | 10/1999 |
| JP | 2000-120903 A | 4/2000 |

(Continued)

OTHER PUBLICATIONS

International Search Report for PCT Appln. No. PCT/JP2007/058492 mailed Jun. 12, 2007.

(Continued)

*Primary Examiner* — John Fox
(74) *Attorney, Agent, or Firm* — Robert P. Michal; Lucas & Mercanti, LLP

(57) ABSTRACT

A fluidic device unit structure in which a plurality of fluidic devices are integrated and which is effective in reducing a footprint is provided. With a fluidic device unit structure in which a plurality of fluidic devices that are connected by channels are integrated in a base member 10 in parallel, the base member 10, which has a plurality of mounting surfaces 11 on which pure-water opening and closing valves 5 are mounted, includes a pure-water circulation supply line 2 that passes through the base member 10 and that is connected in parallel to the pure-water opening and closing valves 5 via pure-water branch channels 4.

2 Claims, 6 Drawing Sheets

U.S. PATENT DOCUMENTS

| | | | |
|---|---|---|---|
| 6,830,067 B2 * | 12/2004 | Hayashi | 137/554 |
| 7,152,629 B2 | 12/2006 | Tokuda et al. | |
| 7,418,978 B2 | 9/2008 | Chao et al. | |
| 7,644,725 B2 * | 1/2010 | Matsuzawa et al. | 137/240 |
| 8,011,389 B2 * | 9/2011 | Hanada | 137/637.1 |
| 2005/0284528 A1 | 12/2005 | Chao et al. | |

FOREIGN PATENT DOCUMENTS

| | | |
|---|---|---|
| JP | 2003-185039 A | 7/2003 |
| JP | 2004-183743 A | 7/2004 |
| JP | 2004-316667 A | 11/2004 |
| JP | 2005-273868 | 10/2005 |
| JP | 2005-307994 | 11/2005 |
| WO | 01/16512 A1 | 3/2001 |

OTHER PUBLICATIONS

Office Action dated Mar. 30, 2011, issued for U.S. Appl. No. 12/279,811 (8 pages).

A final Office Action issued for U.S. Appl. No. 12/279,811 dated Sep. 23, 2011, including Notice of References Cited (8 pages).

Communication (Extended European Search Report) dated Sep. 21, 2012 issued in related European Patent Application 07741928.1 (6 pages).

* cited by examiner

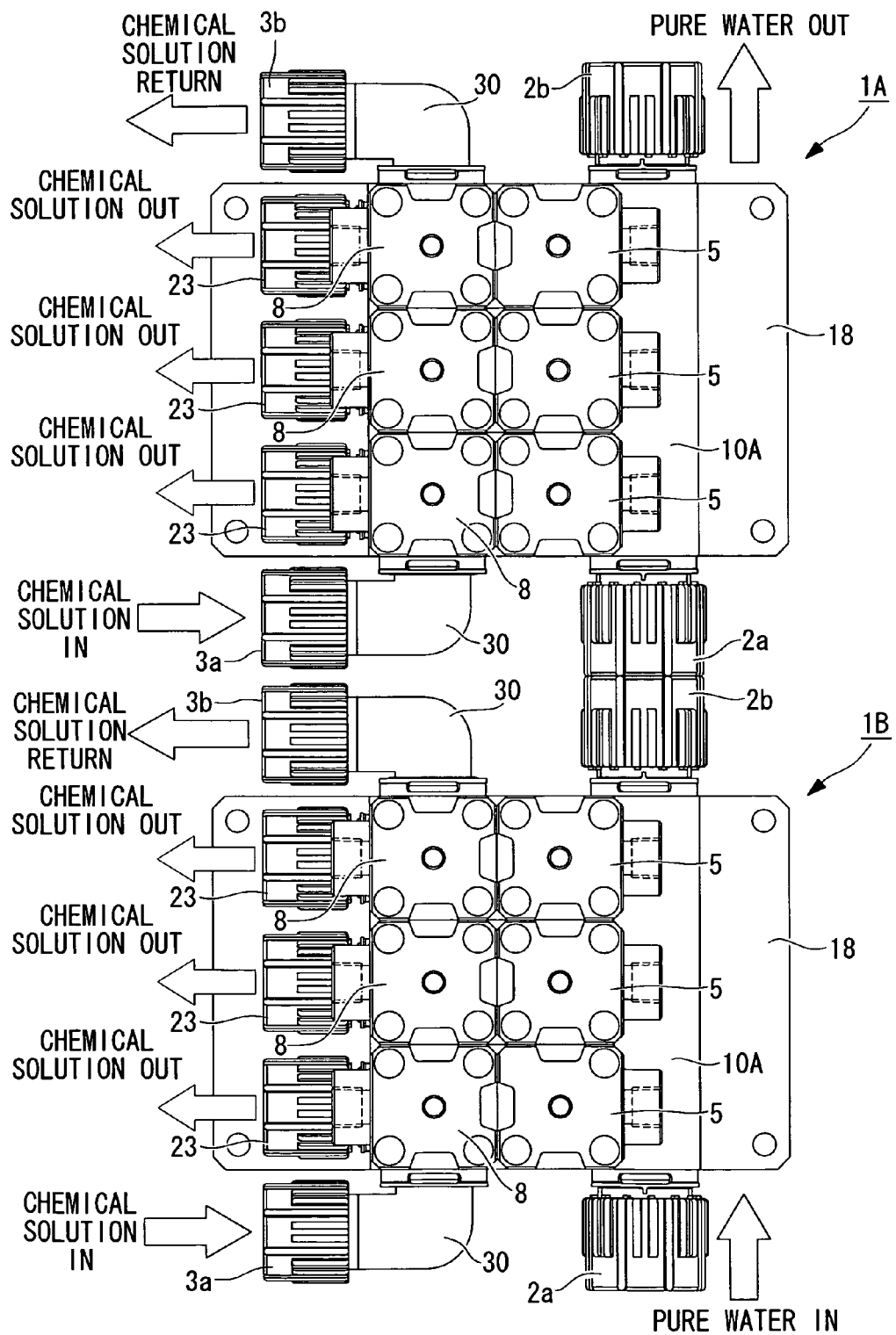

FLUIDIC DEVICE UNIT STRUCTURE

This application is a U.S. National Phase Application under 35 USC 371 of International Application PCT/JP2007/058492 filed Apr. 19, 2007, which claims priority from Japanese Patent Application No. JP 2006-158407 filed Jun. 7, 2006, the entire disclosure of which is incorporated herein by reference.

TECHNICAL FIELD

The present invention relates to a fluidic device unit structure in which fluidic devices such as valves and pressure switches are integrated to handle a plurality of fluids.

BACKGROUND ART

Conventionally, devices for handling fluids, such as chemicals or the like, are configured such that various fluidic devices (various sensors, such as valves, regulators, pressure sensors; and various switches, such as pressure switches) serving as constituent parts are integrated by connecting them with pipes. With a conventional device configuration, when fluid flowing out from a pump or the like is distributed to a plurality of channels, branch pipes having valves are usually connected to header portions provided in the main pipe.

In addition, when using a plurality of chemical solution fluidic devices, as with a semiconductor manufacturing apparatus for example, a configuration in which chemical solution fluidic devices can be connected without using pipes has been proposed, which enables the entire device to be made compact because the pipes are unnecessary (for example, see Patent Document 1).

Patent Document 1: Japanese Unexamined Patent Application, Publication No. 2000-120903 (see FIG. 1)

DISCLOSURE OF INVENTION

Recently, there have been demands for developing a fluidic device unit structure in which a plurality of fluidic devices are integrated (unitized) with the aim of reducing the footprint (projection area in plan view), which is effective in reducing the size of the device by reducing the space for attaching components. Such demands are also made for portions where a main pipe is branched off to a plurality of channels, and the size reduction is thus limited in the conventional structure in which branch pipes are connected using headers.

In addition, with the connecting structure disclosed in the above-described Patent Document 1, because the channels of the chemical solution fluidic devices are linearly connected, i.e., an inline type, or are of a type in which a plurality of valves are connected in parallel using a manifold base, the reduction of the footprint is limited. One type, that is, the inline type, is not suitable for integration because of its structure in which the entire length in a straight line becomes large, and the other type, using the manifold base, is not preferable because the separate manifold base causes an increase in the footprint.

The present invention has been conceived in light of the circumstances described above, and an object thereof is to provide a fluidic device unit structure in which a plurality of the fluidic devices are integrated and which is effective in reducing the footprint, and particularly, to provide a fluidic device unit structure suitable for a device configuration of a portion where a main pipe is branched off to a plurality of channels.

To solve the problems described above, the present invention employs the following solutions.

The present invention is a fluidic device unit structure in which a plurality of fluidic devices that are connected by channels are integrated in parallel in a base member, wherein the base member, which has a plurality of mounting surfaces on which the fluidic devices are mounted, includes fluid circulation lines that pass through the base member and that are connected in parallel to the fluidic devices via connecting channels.

The required number of the above-described fluid circulation lines (one or a plurality) is provided according to a pipe system of the fluidic device unit structure to be integrated.

With this fluidic device unit structure, because the base member, which has the plurality of mounting surfaces on which the fluidic devices are mounted, includes the fluid circulation lines that pass through the base member and that are connected in parallel to the fluidic devices via the connecting channels, the fluidic devices are integrated on the base member provided with the fluid circulation lines, thus reducing the footprint. With the fluidic device unit structure integrated in this way, attachment work to the devices can be simplified.

In addition, because the fluidic devices are connected to the fluid circulation lines via the communication channels, it is possible to prevent the dynamic pressure of the fluid flowing in the fluid circulation lines from directly acting on, for example, valve members constituting the fluidic devices.

With the fluidic device unit structure described above, the connecting channel is preferably inclined at an angle $\theta$ including the vertical. Accordingly, the planar distance between the fluidic devices and the fluid circulation lines is reduced, thus efficiently reducing the footprint.

In this case, when three-way valves are used for the fluidic devices, the connecting channels connected to the fluid circulation lines can be vertically provided; therefore, the footprint can be more easily reduced.

According to the present invention described above, because the fluidic device unit structure is configured such that the base member, which has the plurality of mounting surfaces on which the fluidic devices are mounted, includes the fluid circulation lines that pass through the base member and that are connected in parallel to the fluidic devices via the connecting channels, the fluidic devices are integrated in parallel in the base member provided with the fluid circulation lines, thus making it possible to reduce the footprint and to provide the fluidic device unit structure in which attachment work to the devices is simplified.

In addition, because the fluidic devices are connected to the fluid circulation lines via the communication channels, it is possible to prevent the dynamic pressure of the fluid flowing in the fluid circulation lines from directly acting on, for example, the valve members of the fluidic devices, thus improving the reliability and the durability in terms of the operation or the function of the fluidic devices. In particular, when the connecting channels are inclined at an angle $\theta$ including the vertical, the planar distance between the fluidic devices and the fluid circulation lines is reduced, thus efficiently reducing the footprint. Such a reduction in footprint can be more easily realized by employing the three-way valves in the fluidic devices.

In this way, the fluidic device unit structure of the present invention is effective in reducing the footprint by integrating the plurality of fluidic devices, which is particularly effective in providing the fluidic device unit structure suitable for a device configuration in which a main pipe is branched off to a plurality of channels connected in parallel.

BRIEF DESCRIPTION OF DRAWINGS

FIG. 7 is a plan view showing another embodiment of a fluidic device unit structure according to the present invention.

Figure 1:
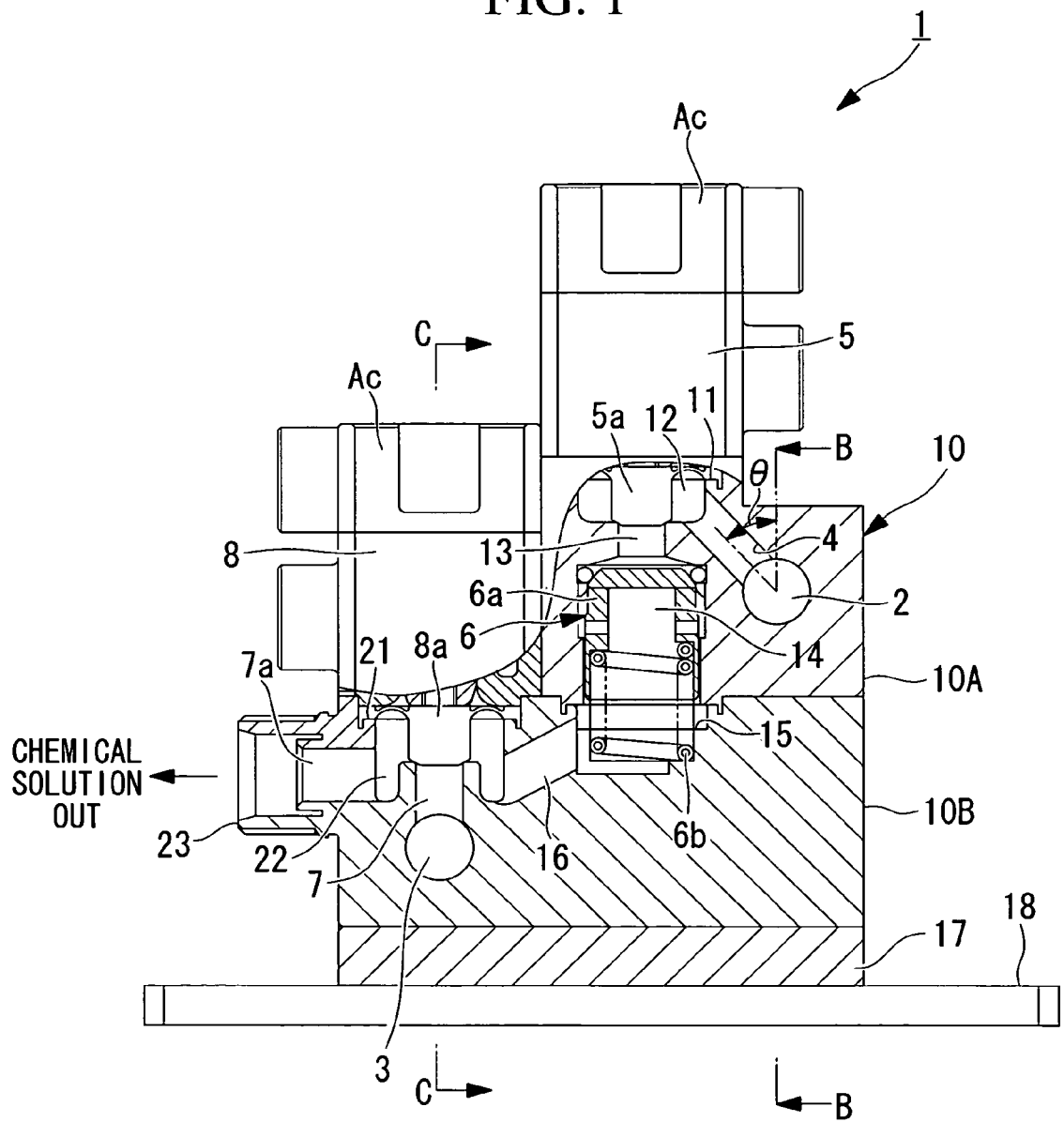
FIG. 1 is a sectional view of principal parts (taken along A-A in FIG. 2), showing an embodiment of a fluidic device unit structure according to the present invention.

EXPLANATION OF REFERENCE SIGNS 1, 1': fluidic device unit
2: pure-water circulation supply line (fluid circulation line)
2a, 2b, 3a, 3b, 23: connector
3, 3': chemical-solution circulation supply line (fluid circulation line)
4: pure-water branch pipe (connecting channel)
5: pure-water opening and closing valve
5a, 6a, and 8a: valve member
6: check valve
6b: spring
7, 7': chemical-solution branch pipe (connecting channel)
8, 8': chemical-solution opening and closing valve
10, 10': base member
10A: upper main body
10B, 10C: lower main body
11, 21: mounting surface
12, 15, 22: recessed portion
13, 24: channel
14: housing space
16, 16': inclined channel
Ac: actuator

BEST MODE FOR CARRYING OUT THE INVENTION

An embodiment of a fluidic device unit structure according to the present invention will be described below with reference to the drawings.

A fluidic device unit 1 shown in FIGS. 1 to 4 has a plurality of fluidic devices that are connected by channels and that are integrated in parallel in a base member 10. The base member 10, provided with a plurality of mounting surfaces 11 and 21 for mounting the fluidic devices, includes fluid circulation lines that pass through the base member 10 and that are connected in parallel to the fluidic devices via connecting channels.

Figure 5:
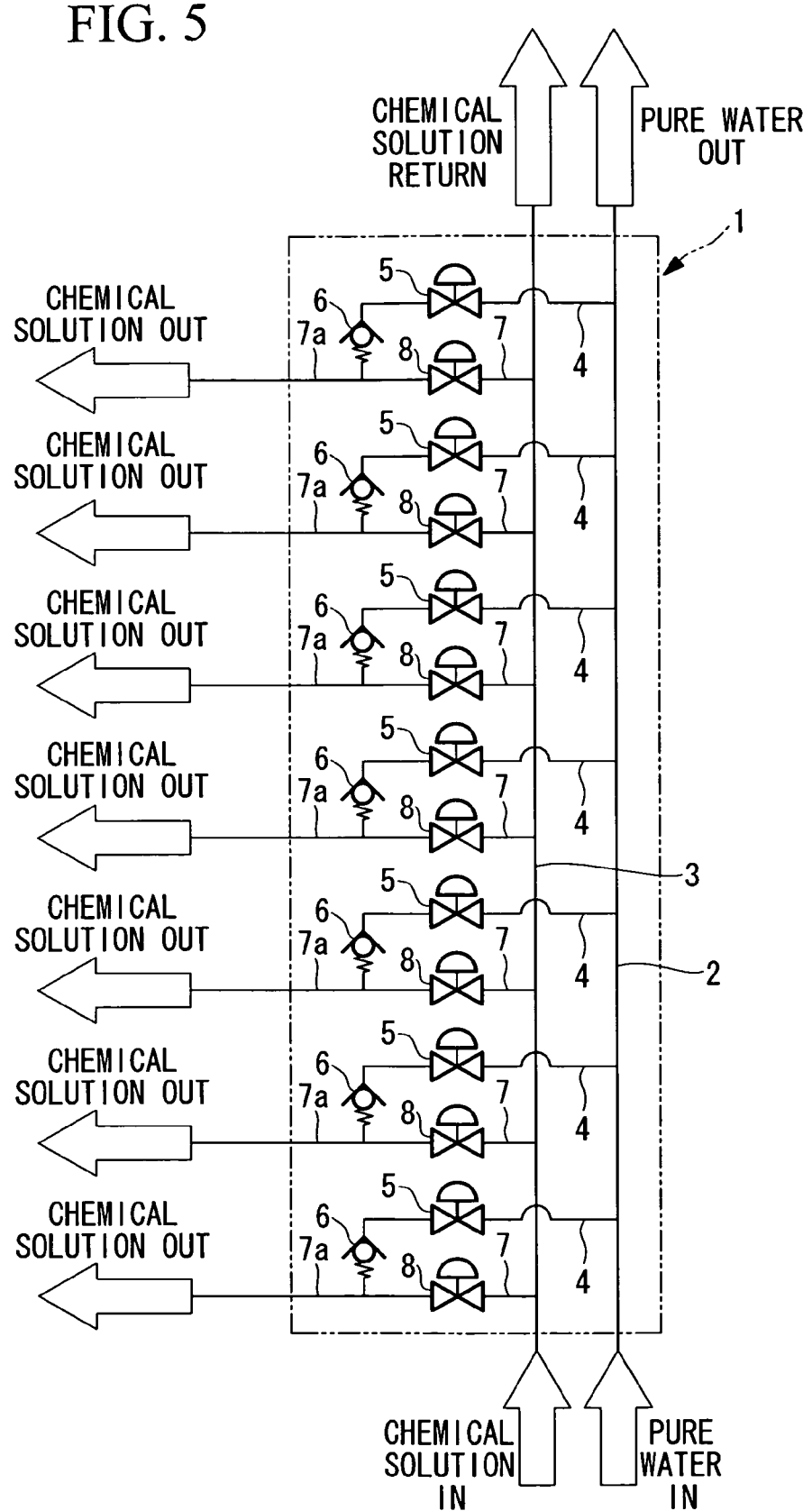
FIG. 5 is a piping system diagram showing an internal configuration of the fluidic device unit structure shown in FIG. 2.

The fluidic device unit 1 in which valves and pipe channels shown in a piping system diagram in FIG. 5 are integrated as a single unit will be described below with reference to the example configuration of FIGS. 1 to 4.

The fluidic device unit 1 shown in the figure is, for example, part of a semiconductor manufacturing apparatus and includes a pure-water circulation supply line 2 and a chemical-solution circulation supply line 3 that are disposed in parallel.

The pure-water circulation supply line 2 is a fluid circulation line horizontally passing through the base member 10. Pure-water main pipes for supplying pure water to the fluidic device unit 1 are connected to both ends thereof. Because the pure-water circulation supply line 2 is connected to the fluidic devices by pure-water branch pipes 4 that are formed in a branching manner in the interior of the base member 10, the pure-water branch pipes 4 serve as the connecting channels in this case. In the example shown in the figure, seven pure-water branch pipes 4 branching in parallel from the pure-water circulation supply line 2 are inclined at an inclination angle θ in the interior of the base member 10. Pure-water opening and closing valves 5 and check valves 6 of the fluidic devices are connected via pure-water branch pipes 4.

Similar to the pure-water circulation supply line 2 described above, the chemical-solution circulation supply line 3 is a fluid circulation line horizontally passing through the base member 10. Chemical-solution main pipes for supplying a chemical solution to the fluidic device unit 1 are connected to both ends thereof. Because the chemical-solution circulation supply line 3 is connected to the fluidic devices by chemical-solution branch pipes 7 that are formed in a branching manner in the interior of the base member 10, the chemical-solution branch pipes 7 serve as the connecting channels in this case. In the example shown in the figure, seven chemical-solution branch pipes 7 are provided so as to branch in parallel from the chemical-solution circulation supply line 3 in the vertical direction, and chemical-solution opening and closing valves 8 of the fluidic devices are provided at the chemical-solution branch pipes 7, respectively.

In addition, ends of the pure-water branch pipes 4 branching from the pure-water circulation supply line 2 are connected downstream of the chemical-solution opening and closing valves 8 provided at the chemical-solution branch pipes 7, that is, at intermediate positions in the chemical-solution branch pipes 7, which are at the opposite side from the chemical-solution circulation supply line 3 with reference to the chemical-solution opening and closing valves 8. The ends of the pure-water branch pipes 4 connected to the chemical-solution branch pipes 7 are located downstream of the check valves 6 and at the opposite side from the pure-water circulation supply line 3.

With the fluidic device unit 1 having the above-described structure, part of the chemical solution flowing through the chemical-solution circulation supply line 3 is branched off while flowing through the chemical-solution branch pipes 7 whose chemical-solution opening and closing valves 8 are opened and is then supplied to desired positions outside the unit. At this time, the chemical solution can be prevented from flowing into the pure-water circulation supply line 2 through the pure-water branch pipes 4 by the function of the check valves 6, regardless of the open/closed state of the pure-water opening and closing valves 5.

In addition, by opening the desired pure-water opening and closing valves 5 with the chemical-solution opening and closing valves 8 closed, part of the pure water flowing in the pure-water circulation supply line 2 is branched off into the pure-water branch pipes 4. Because this pure water flows into the chemical-solution branch pipes 7 by passing through the pure-water opening and closing valves 5 and the check valves 6 in the pure-water branch pipes 4, the chemical-solution branch pipes 7 located downstream of the chemical-solution opening and closing valves 8 can be cleaned by the pure water.

Specifically, in conjunction with the check valves 6, the chemical-solution opening and closing valves 8 described above function as three-way valves capable of selectively switching between a channel in which the chemical solution supplied from the chemical-solution circulation supply line 3 is made to flow out of the unit and a channel in which the pure water supplied from the pure-water circulation supply line 2 is made to flow out of the unit.

Figure 2:
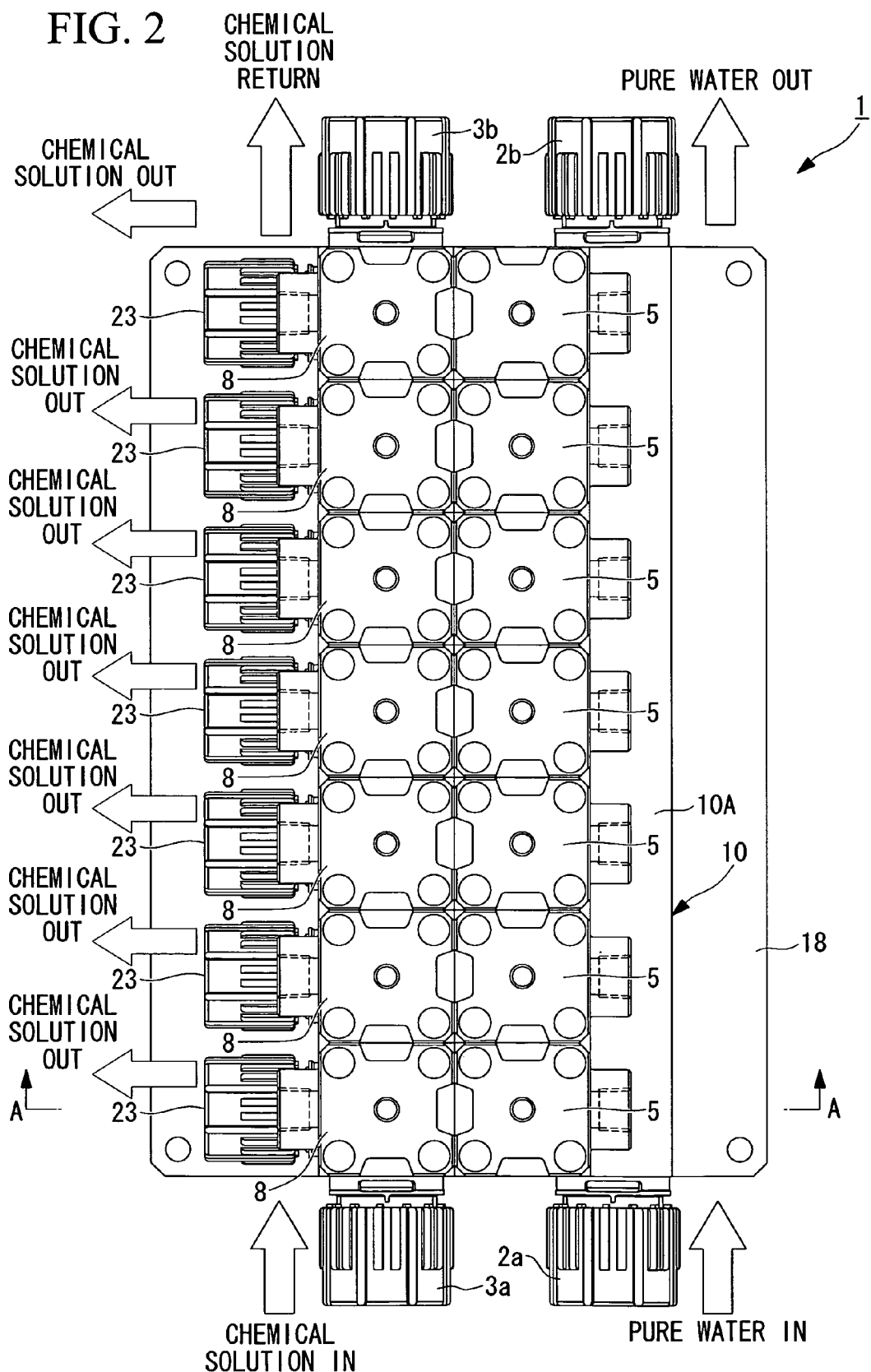
FIG. 2 is a plan view showing an embodiment of a fluidic device unit structure according to the present invention.
Figure 3:
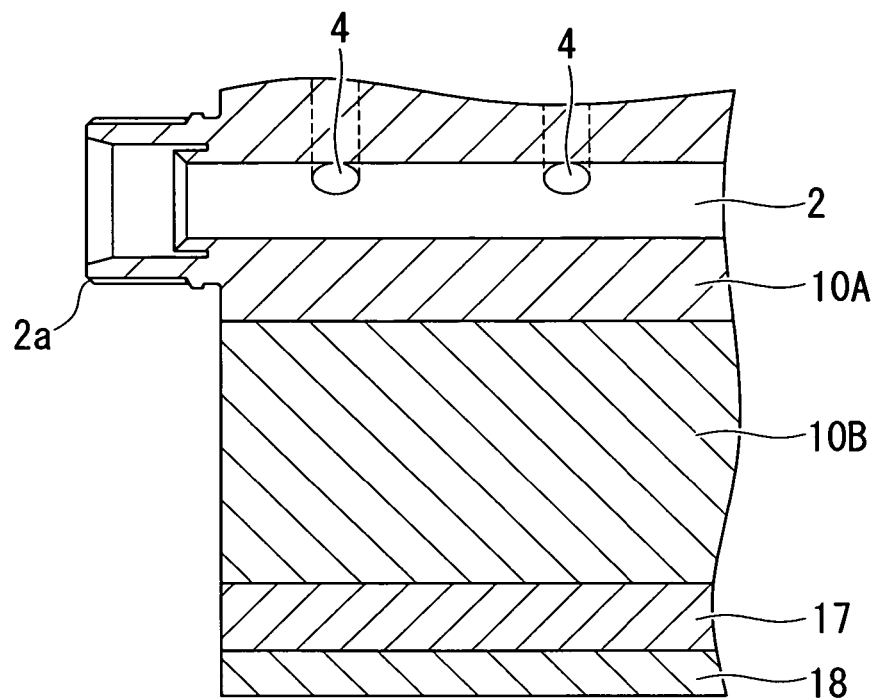
FIG. 3 is a sectional view taken along B-B in FIG. 1.
Figure 4:
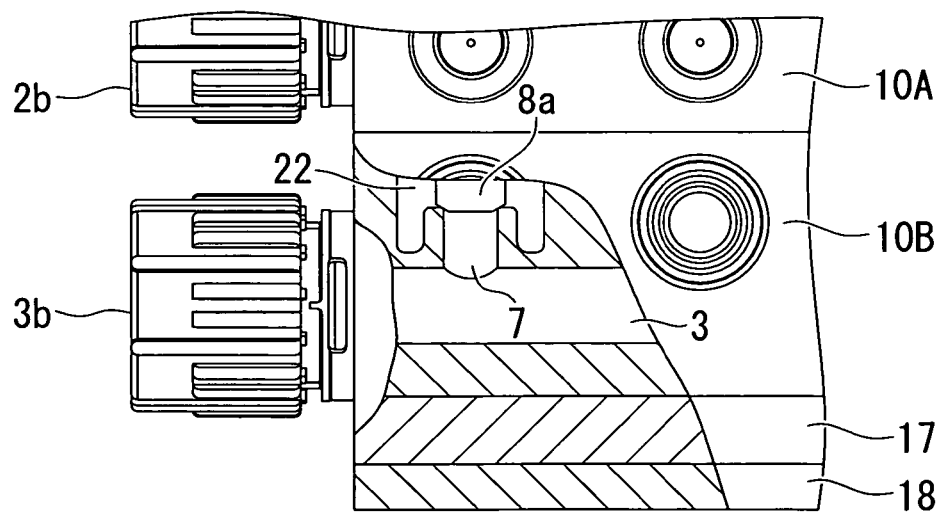
FIG. 4 is a sectional view taken along C-C in FIG. 1.

In a plan view shown in FIG. 2, the fluidic device unit 1 has the pure-water circulation supply line (not shown) and the chemical-solution circulation supply line (not shown) provided in parallel and passing through the base member 10 in the vertical direction in the figure. In this embodiment, for example, as shown in FIG. 1, the base member 10 is divided into two, i.e., an upper main body 10A and a lower main body 10B, and is integrated by stacking the upper main body 10A in a manner as to cover substantially the right half of an upper surface of the lower main body 10B. In addition, one main body, i.e., the upper main body 10A, is provided with the pure-water circulation supply line 2, and the other main body, i.e., the lower main body 10B, is provided with the chemical-solution circulation supply line 3.

The pure-water circulation supply line 2 passes through the upper main body 10A and is a linear pure-water channel having connectors 2a and 2b for connecting the pure-water main pipes at both ends thereof. On the upper surface of the upper main body 10A, seven mounting surfaces 11 for the pure-water opening and closing valves 5 communicating with the pure-water branch pipes 4 that are inclined at an inclination angle θ are disposed in the vertical direction at positions slightly shifted towards the chemical-solution circulation supply line 3 side (inner side) from the central axis of the pure-water circulation supply line 2. The pure-water opening and closing valves 5 shown in the figure are pneumatically operated valves and have actuators Ac at the top thereof.

The pure-water opening and closing valve 5 accommodates a valve member 5a in a recessed portion 12 formed at the center portion of the mounting surface 11. The valve member 5a is, for example, a protruding portion provided at a diaphragm, and opens and closes a fluid inlet corresponding to the upper end of a channel 13 by moving up and down by operating the actuator Ac. The channel 13 is a through-hole vertically communicating between the recessed portion 12 and a housing space 14 of the check valve 6 formed at the lower surface side of the upper main body 10A.

The check valve 6 is disposed in a space formed between the housing space 14 and a recessed portion 15 that is formed on an upper surface of the lower main body 10B and has a valve member 6a and a spring 6b that urges upward so that the valve member 6a closes a fluid outlet corresponding to the lower end of the channel 13.

The chemical-solution circulation supply line 3 passes through the lower main body 10B and is a linear chemical solution channel having connectors 3a and 3b for connecting the chemical-solution main pipe at both ends thereof. On the upper left surface of the lower main body 10B, seven mounting surfaces 21 for the chemical-solution opening and closing valves 8 are vertically disposed in parallel. These chemical-solution opening and closing valves 8 are also pneumatically operated valves and have actuators Ac at the top thereof.

The chemical-solution opening and closing valve 8 accommodates a valve member 8a, which is similar to the valve member 5a, in a recessed portion 22 formed at the center portion of the mounting surface 21. The valve member 8a opens and closes a fluid inlet corresponding to the upper end of the chemical-solution branch pipe 7 by moving up and down by operating the actuator Ac. The chemical-solution branch pipe 7 is a communicating passage that communicates between the chemical-solution circulation supply line 3 and the chemical-solution opening and closing valve 8 and that has an inclination angle θ in the vertical direction. Reference numeral 23 in the figure is a connector for a chemical solution outlet of the chemical-solution opening and closing valve 8.

In the lower main body 10B, the housing space 15 and the recessed portion 21 are connected by an inclined channel 16; therefore, this inclined channel 16 corresponds to the end of the pure-water branch pipe 4 that is connected to the intermediate portion of the chemical-solution branch pipe 7. More specifically, with the fluidic device unit 1 having the above-described structure, the chemical solution flowing in the chemical-solution circulation supply line 3 is branched off into the chemical-solution branch pipe 7 whose chemical-solution opening and closing valve 8 is open, or, the pure water flowing in the pure-water circulation supply line 2 is branched off into the pure-water branch pipe 4 whose pure-water opening and closing valve 5 is open and then flows through a chemical-solution branch pipe outlet 7a located downstream of the closed chemical-solution opening and closing valve 8. Both streams can flow out of the unit. With this structure, because both lower ends of the channels of the chemical-solution branch pipe outlet 7a and the inclined channel 16 are connected to be aligned with the lower ends of the recessed portion 22, a space in which the fluid remains can be eliminated.

In the example configuration shown in the drawings, the main parts of the fluidic device unit 1 are made of fluorocarbon resin having chemical resistance. Reference numeral 17 in the drawings denotes a base securing plate, and 18 denotes a unit baseplate.

With the fluidic device unit 1 according to the present invention, the base member 10, provided with the plurality of mounting surfaces 11 and 21 for mounting the fluidic devices, such as the pure-water opening and closing valves 5 and the chemical-solution opening and closing valves 8, includes the pure-water circulation supply line 2 that passes through the upper main body 10A and that is connected in parallel to the pure-water opening and closing valves 5 via the pure-water branch pipes 4 and includes the chemical-solution circulation supply line 3 that passes through the lower main body 10B and that is connected in parallel to the chemical-solution opening and closing valves 8 via the chemical-solution branch pipes 7. Accordingly, the fluidic devices are integrated in parallel on the base member 10 provided with the fluid circulation lines, such as the pure-water circulation supply line 2 and the chemical-solution circulation supply line 3, thus allowing the footprint to be reduced. In particular, because the above-described chemical-solution opening and closing valves 8 function as three-way valves in conjunction with the check valves 6, the chemical-solution branch pipes 7 connected to the chemical-solution circulation supply line 3 can be provided substantially vertically. As a result, compared with a modification described below (see FIG. 6), no planar space is required for disposing the chemical-solution circulation supply line 3, easily reducing the footprint by that amount.

In addition, with the fluidic device unit 1 in which the channels and the fluidic devices are integrated, because attachment of the main pipes or the like to the devices can be minimized, the assembly work becomes easy.

Furthermore, because the fluidic devices, such as the pure-water opening and closing valves 5 and the chemical-solution opening and closing valves 8, are connected to the fluid circulation lines, such as the pure-water circulation supply line 2 and the chemical-solution circulation supply line 7 via the pure-water branch pipes 4 and the chemical-solution branch pipes 7 that serve as communication channels, it is possible to prevent the dynamic pressure of the fluid flowing in the pure-water circulation supply line 2 and the chemical-solution circulation supply line 7 from directly acting on the valve members 5a and 8a of the pure-water opening and closing valves 5 and the chemical-solution opening and closing valves 7. Accordingly, the reliability and durability of the operation and function of the fluidic devices is improved.

In particular, when the connecting channels, such as the pure-water branch pipes 4 and the chemical-solution branch pipes 7, are inclined at an angle θ including the vertical, that is, inclined at an inclination angle θ excluding the horizontal, the planar distance between the fluidic devices, such as the pure-water opening and closing valves 5 and the chemical-solution opening and closing valves 8, and the fluid circulation lines, such as the pure-water circulation supply line 2 and the chemical-solution circulation supply line 7, is reduced, thus effectively reducing the footprint.

Figure 6:
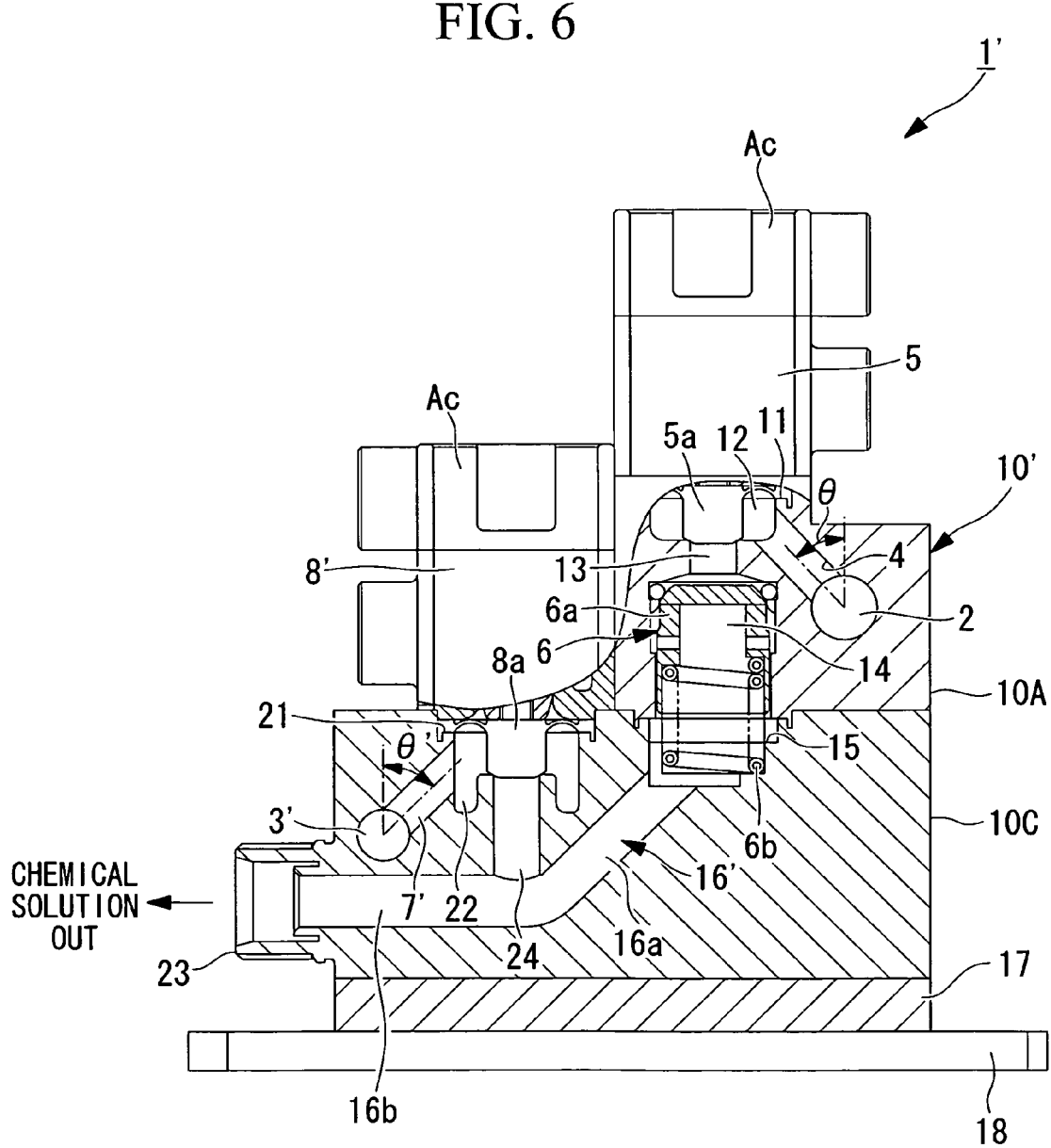
FIG. 6 is a sectional view of principal parts showing a modification of FIG. 1.

Next, a modification of the above-described fluidic device unit 1 will be described with reference to FIG. 6. Parts that are identical to those in the above-described embodiment in FIG. 1 are assigned the same reference numerals, and a detailed description thereof will be omitted.

With a fluidic device unit 1' shown in the figure, a two-way valve is used for a chemical-solution opening and closing valve 8' in a lower main body 10C of a base member 10'. One end of the chemical-solution opening and closing valve 8' is connected to a chemical-solution circulation supply line 3' by a chemical-solution branch pipe 7' that has an inclination angle θ' and communicates with a recessed portion 22, and the other end of the chemical-solution opening and closing valve 8' is connected to an inclined channel 16' by a vertical channel 24.

The channel 24 intersects the inclined channel 16' communicating with a connector 23 for the chemical solution outlet from the check valve 6 in a T-shape. An inclined portion 16a and a horizontal portion 16b are coupled to form the inclined channel 16'. With the structure in the figure, the vertical channel 24 is connected to the horizontal portion 16b.

In the modification described above, because the chemical-solution circulation supply line 3' is connected to the chemical-solution opening and closing valve 8' by the chemical-solution branch pipe 7' having the inclination angle θ', the footprint becomes larger at the connector 23 side when compared with the embodiment shown in FIG. 1.

In other words, in this modification, similar to the above-described embodiment, the footprint can be reduced. When compared with the structure of the embodiment in which the chemical-solution branch pipe 7 is disposed at a central-axis position of the chemical-solution opening and closing valve 8, the footprint of the lower main body 10C is larger by an amount equal to the distance of the chemical-solution branch pipe 7', having the inclination angle θ', from the central-axis position of the chemical-solution opening and closing valve 8'.

With this structure, it is also possible to flow the chemical solution introduced from the chemical-solution circulation supply line 3' to the connector 23 serving as the chemical solution outlet when the valve member 8a is opened, and to flow the pure water introduced from the pure-water circulation supply line 2 to the connector 23 serving as the chemical solution outlet when the valve member 8a is closed.

With this modification, because a stagnating space where the fluid remains is formed in the recessed portion 22, a problem such as solidification is of concern depending on the type of fluid, such as chemical solution.

With the fluidic device unit 1 of the embodiment described above, two types of fluids (pure water and chemical solution) are handled; however, it can also be applied to cases where one type or three or more types of fluids are handled.

Another embodiment shown in FIG. 7 shows a case in which three types of liquids, for example, two types of chemical solutions and pure water, are handled. In the embodiment shown in the figure, two groups of fluidic device units 1A and 1B having a similar structure to the above-described embodiment are integrated (provided that there are three pure-water branch pipes 4 and three chemical-solution branch pipes 7). In this case, by coupling the connectors 2a and 2b of the pure-water circulation supply lines, the pure-water circulation supply lines are connected in series, and then the pure-water main pipes are connected to both ends of the connectors 2a and 2b.

Regarding the chemical-solution circulation supply lines, the connectors 3a and 3b are attached via elbows 30 at both ends of the units, and chemical-solution main pipes through which different types of chemical solutions flow are attached to the connectors 3a and 3b, respectively.

In this way, by appropriately changing the number of fluidic device units to which the pure-water circulation supply lines are connected in series, the number of types of fluids to be handled can be increased. In addition, by dividing the pure-water circulation supply lines in a manner similar to the chemical-solution circulation supply lines, it is also possible to handle many types of fluids. When handling one type of fluid, for example, the chemical-solution circulation supply line 3 side in FIG. 1 may be eliminated, and, for example, a portion corresponding to the inclined channel 16 may serve as an outlet of the fluid that is branched off.

In this way, with the fluidic device unit structure according to the present invention, by integrating a plurality of fluidic devices, the footprint can be reduced. It is particularly suitable for a device configuration in which a plurality of channels are connected in parallel to a main pipe by being branched off therefrom.

The present invention is not restricted to the embodiment described above. Suitable modifications can be made so long as they do not depart from the spirit of the present invention.

The invention claimed is:
1. A fluidic device unit comprising:
a plurality of pure-water opening and closing valves;
a plurality of chemical-solution opening and closing valves which correspond to the plurality of pure-water opening and closing valves, respectively; and
a base member including a pure-water circulation supply line and a chemical-solution circulation supply line, the plurality of pure-water opening and closing valves and the plurality of chemical-solution opening and closing valves being integrated via the base member,
wherein the base member further includes
a plurality of pure-water branch pipes that connect the plurality of pure-water opening and closing valves, respectively, with the pure-water circulation supply line,
a plurality of chemical-solution branch pipes that connect the plurality of chemical-solution opening and closing valves, respectively, with the chemical-solution circulation supply line,
a plurality of chemical-solution branch pipe outlets that are connected, respectively, to the plurality of chemical-solution opening and losing valves, and
a plurality of inclined channels that connect the plurality of pure-water opening and closing valves, respectively, with the plurality of chemical-solution opening and closing valves, the plurality of inclined channels guiding pure-water from the pure-water opening and closing valves, respectively, to the chemical-solution opening and closing valves which are, respectively, located lower than the pure-water opening and closing valves, wherein the chemical-solution flows through the chemical-solution branch pipe outlets when the chemical-solution opening and closing valves are opened, respectively, and wherein the pure-water flows through the chemical-solution branch pipe outlets when the chemical-solution opening and closing valves are closed and the pure-water opening and closing valves are opened, respectively.

2. The fluidic device unit according to claim 1, further comprising:

a plurality of check valves provided, respectively, between the plurality of pure-water opening and closing valves, respectively, and the plurality of inclined channels, respectively, each of the plurality of check valves preventing the chemical solution from flowing into the pure-water circulation supply line through the pure-water branch pipes, respectively.

* * * * *

UNITED STATES PATENT AND TRADEMARK OFFICE
CERTIFICATE OF CORRECTION

PATENT NO.       : 8,365,768 B2
APPLICATION NO.  : 12/227967
DATED            : February 5, 2013
INVENTOR(S)      : Hiroki Igarashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

First Day of September, 2015

Michelle K. Lee
*Director of the United States Patent and Trademark Office*